US010583928B2

United States Patent
White et al.

(10) Patent No.: US 10,583,928 B2
(45) Date of Patent: Mar. 10, 2020

(54) INLINE HEATER CONTROLLER

(71) Applicant: B/E AEROSPACE, INC., Wellington, FL (US)

(72) Inventors: Alan L. White, Rockton, IL (US); Greg King, Roscoe, IL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 284 days.

(21) Appl. No.: 15/595,370

(22) Filed: May 15, 2017

(65) Prior Publication Data

US 2018/0290756 A1    Oct. 11, 2018

Related U.S. Application Data

(60) Provisional application No. 62/483,685, filed on Apr. 10, 2017.

(51) Int. Cl.
*B64D 13/08* (2006.01)
*G05D 23/24* (2006.01)
*B64D 11/02* (2006.01)
*B64D 13/06* (2006.01)

(52) U.S. Cl.
CPC .............. *B64D 13/08* (2013.01); *B64D 11/02* (2013.01); *G05D 23/24* (2013.01); *B64D 13/06* (2013.01); *B64D 2013/0603* (2013.01)

(58) Field of Classification Search
CPC . B64D 13/08; B64D 13/00; B64D 2013/0603
USPC ...................................................... 244/118.5
See application file for complete search history.

(56) References Cited

U.S. PATENT DOCUMENTS

| 4,620,084 A | 10/1986 | Cunningham |
| 5,216,743 A | 6/1993 | Seitz |
| 5,872,890 A | 2/1999 | LaCombe |
| 5,960,160 A | 9/1999 | Clark et al. |

(Continued)

FOREIGN PATENT DOCUMENTS

| EP | 2 595 026 A1 | 5/2013 |
| WO | 2011/101642 A2 | 8/2011 |

OTHER PUBLICATIONS

Acromag, Inc., "Criteria for Temperature Sensor Selection of T/C and RTD Sensor Types," May 2011, retrieved from Internet website: https://www.acromag.com/sites/default/files/RTD_Temperature_Measurement_917A.pdf, 22 pages.

(Continued)

*Primary Examiner* — Claude J Brown
(74) *Attorney, Agent, or Firm* — Donna P. Suchy

(57) ABSTRACT

An in-line heater system on board an aircraft includes a heater element positioned within a tubing, at least one sensor positioned within the tubing configured to monitor the temperature within the tubing, and an inline heater controller configured to receive information regarding the heater element via the at least one sensor. The inline heater controller is positioned at a location spaced away from the heater element and the tubing. The inline heater controller includes a printed circuit board configured to receive the information regarding the heater element via the at least one sensor, and an aerospace connector configured to transmit the information regarding the heater element via the at least one sensor to the aircraft.

21 Claims, 3 Drawing Sheets

(56) References Cited

U.S. PATENT DOCUMENTS

| | | | |
|---|---|---|---|
| 6,211,494 B1 * | 4/2001 | Giamati | B64C 1/1453 |
| | | | 219/201 |
| 6,539,173 B2 | 3/2003 | Chu | |
| 6,633,726 B2 | 10/2003 | Bradenbaugh | |
| 6,753,513 B2 | 6/2004 | Goldberg et al. | |
| 6,906,537 B2 | 6/2005 | Goldberg et al. | |
| 6,919,543 B2 | 7/2005 | Abbott et al. | |
| 7,158,718 B2 | 1/2007 | Russegger | |
| 7,644,650 B2 | 1/2010 | Suzuki | |
| 7,891,287 B2 | 2/2011 | Miller | |
| 8,270,822 B2 | 9/2012 | Sasaki et al. | |
| 8,479,640 B2 | 7/2013 | Gavillet et al. | |
| 8,481,898 B2 | 7/2013 | Parker | |
| 8,558,150 B2 | 10/2013 | Chappell | |
| 8,573,116 B2 | 11/2013 | Etter et al. | |
| 8,981,265 B2 | 3/2015 | Jiao et al. | |
| 9,046,899 B2 | 6/2015 | Shearer et al. | |
| 9,140,466 B2 | 9/2015 | Jurczyszak et al. | |
| 9,395,102 B2 | 7/2016 | Hammer et al. | |
| 2005/0263518 A1 | 12/2005 | Weiss | |
| 2007/0158501 A1 * | 7/2007 | Shearer | B64D 13/00 |
| | | | 244/118.5 |
| 2014/0332521 A1 * | 11/2014 | Shearer | B64D 13/08 |
| | | | 219/494 |
| 2015/0086185 A1 * | 3/2015 | Semyanko | B64D 11/04 |
| | | | 392/360 |
| 2015/0312963 A1 | 10/2015 | Kiernan et al. | |
| 2016/0000262 A1 | 1/2016 | Kelly et al. | |
| 2016/0067639 A1 | 3/2016 | Shimpi et al. | |
| 2016/0130006 A1 | 5/2016 | Brouwers et al. | |

OTHER PUBLICATIONS

Goodrich, "Total Temperature Sensors," Technical Report 5755, 1994, retrieved from internet website: http://www.flightdatacommunity.com/wp-content/uploads/downloads/2013/02/TAT-Report.pdf, 32 pages.
International Search Report and Written Opinion on International Patent Application No. PCT/US2018/026764 dated Jul. 9, 2018. 14 pages.

* cited by examiner

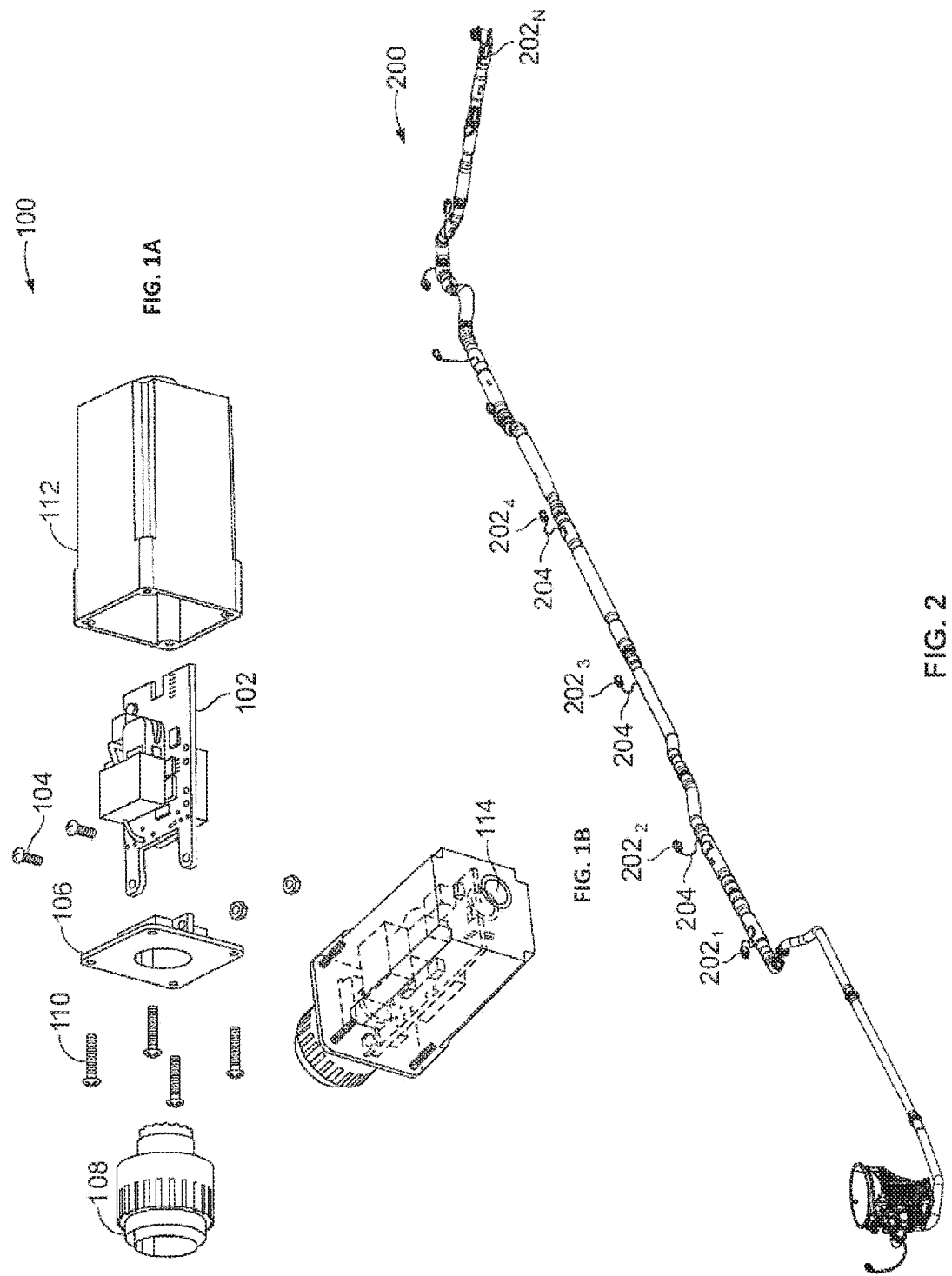

INLINE HEATER CONTROLLER

CROSS-REFERENCE TO RELATED APPLICATIONS

The present application claims the priority benefit of U.S. Provisional Patent Application No. 62/483,685, filed on Apr. 10, 2017, and incorporated herein by reference.

FIELD OF THE DISCLOSURE

The present disclosure generally relates to a method and apparatus for monitoring and controlling temperature, and more specifically to a method and apparatus for monitoring and controlling temperature of components within an aircraft.

BACKGROUND

Temperature control and monitoring the temperature of system components of an aircraft poses challenges that do not generally occur in ground-based temperature control and monitoring apparatuses. Conventionally used thermostats require that they be locally mounted to heated hardware and system components, which require additional components to secure them therefore adding weight.

DRAWINGS

While the appended claims set forth the features of the present techniques with particularity, these techniques may be best understood from the following detailed description taken in conjunction with the accompanying drawings of which:

FIG. 1A is an exploded view of the temperature control and monitoring apparatus, configured according to an embodiment.

FIG. 1B is an isometric view of the assembled temperature control and monitoring apparatus configured according to an embodiment.

FIG. 2 is a system drawing illustrating the implementation of the temperature control and monitoring apparatus, configured according to an embodiment.

DETAILED DESCRIPTION

Figure 3:
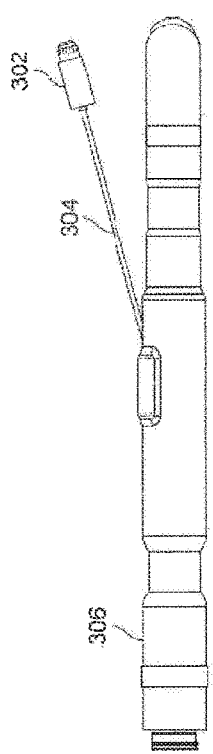
FIG. 3 is a side view of a tubing having the temperature control and monitoring apparatus, according to an embodiment.

The disclosure is generally directed to a temperature control and monitoring apparatus and a method for monitoring and controlling the temperature of one or more system components aboard an aircraft. A temperature control and monitoring apparatus designed to replace a conventional thermostat used in an aircraft is disclosed according to an embodiment. In one embodiment, an inline heater controller is a temperature control and monitoring device intended to replace a thermostat used on heaters related to system components. By way of example, the inline heater controller may control the heating of waste and water system components of an aircraft. A person possessing ordinary skill in the art will understand that the disclosed inline heater controller may be applied to plumbing, tanks, and valves aboard an aircraft, as well as additional systems within an aircraft.

In an embodiment, the inline heater controller interfaces to a heater by means of a wire harness. The wire harness may include a resistive temperature sensor locally mounted on the heater. According to an embodiment, the inline heater controller is designed to be implemented on a printed circuit board. According to yet another embodiment, the printed circuit board is configured to be replaceable without damage to the connected heater.

In an embodiment, the inline heater controller is mounted to the back of an aerospace connector and is intended to be housed in place of a back shell. Such a configuration reduces space requirements of the heated components, thereby allowing items such as plumbing to be routed through reduced clearance areas compared to conventionally used thermostats.

Moreover, the inline heater controller is configured to provide fault information to the aircraft according to an embodiment. Specifically, the inline heater controller may receive information regarding an open circuit, a short circuit, temperature fluctuations outside of a predetermined range, power failure, and/or internal fault. According to an embodiment, the fault information may be transmitted to the aircraft using a single sinking output thus allowing for a standard connection to aircraft input devices or for simple use with a panel lamp indicator or other data monitoring devices.

In an embodiment, the output of the inline heater controller interfaces to the aircraft for power and also provides a sinking output for standard connection to aircraft input devices or for use with panel lamp indicators or other data monitoring devices.

Turning to FIG. 1A, an exploded view of the temperature control and monitoring apparatus 100 is illustrated. According to an embodiment, the inline heater controller is implemented on a printed circuit board (PCB) 102. As shown in FIG. 1A, the PCB 102 is fastened via a plurality of fasteners 104 to an aluminum carrier plate 106. The aluminum carrier plate 106 is connected to the back of an aerospace connector 108 via a threaded connection. As further illustrated in FIG. 1A, the PCB 102 is housed in a molded housing 112. The aluminum carrier plate 106 is connected to the molded housing 112 by using a plurality of self-taping screws 110. As illustrated in FIG. 1B, the molded housing 112 includes a potted strain relief 114 on a second end opposite the connector 108.

Turning to FIG. 2, a system 200 illustrating a plurality of inline heater controllers $202_1$-$202_N$, implemented within a series of plumbing tubes on an aircraft is illustrated, according to an embodiment. In various embodiments, any suitable number of inline heater controllers $202_1$-$202_N$ may be provided to monitor and control the temperature of the tubing. A person skilled in the art will appreciate that the tubing is shown merely for illustration purposes and any number of system components may be monitored using the inline heater controllers $202_1$-$202_N$. As illustrated in FIG. 2, the inline heater controllers $202_1$-$202_N$ are disposed outside the tubing, and are connected to the tubing via a respective wire harness 204.

According to an embodiment, the inline heater controllers $202_1$-$202_N$ receive information about the temperature within the tubing via one or more sensors (discussed below with reference to FIG. 6). In an embodiment, the inline heater controllers $202_1$-$202_N$ may be configured to monitor temperature fluctuations outside of a predetermined range. A heater element configured to control the temperature may be positioned within the tubing.

Figure 6:
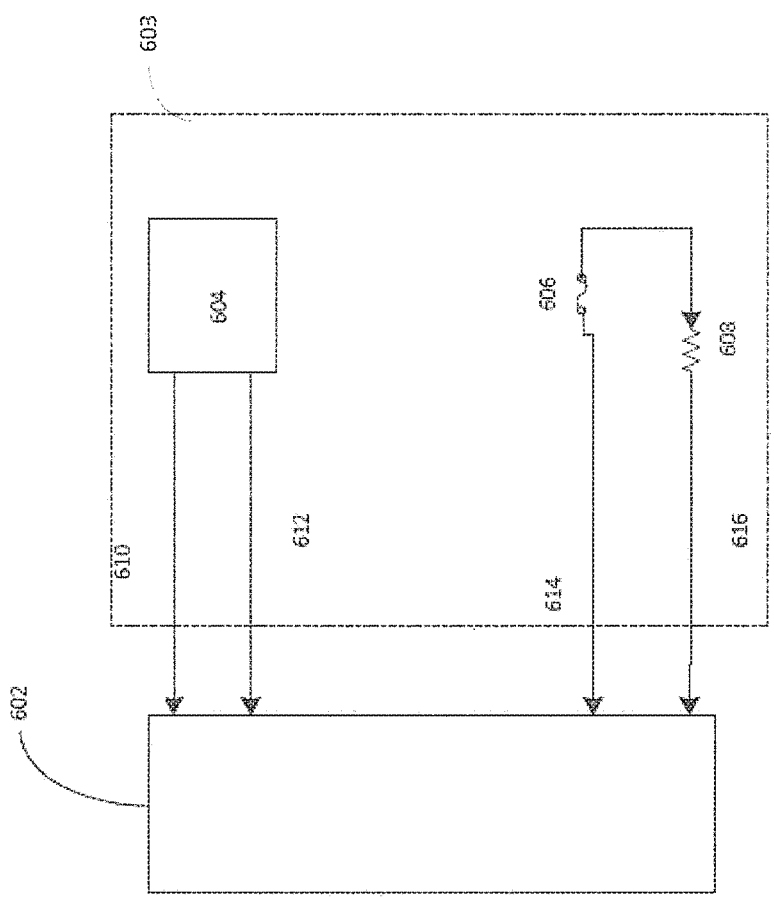
FIG. 6 is an electrical representation of an inline heater system according to an embodiment.

FIG. 6 is a schematic drawing of an inline heater controller 602 identical to the inline heater controller 100 of FIG. 1A, according to one embodiment. According to an embodiment, the inline heater controller 602 is connected to a heated assembly 603. In various embodiments, the heated assembly 603 may be a waste tubing assembly or other heated system components. Wires 610 and 612 connecting a temperature sensor 604 to the inline heater controller 602 are installed. According to an embodiment, the temperature sensor 604 may be a thermistor which provides temperature information to the inline heater controller 602 via wires 610 and 612. A thermal fuse 606 and a heater element 608 are also installed in the heated assembly 603. The thermal fuse 606 is connected to the inline heater controller 602 via a wire 614 and is also in a series connection with the heater element 608 and connected to the inline heater controller 602 by the wire 616. According to an embodiment, the wires 614 and 616 may provide information relating to the status of the heated assembly 603 to the inline heater controller 602. In an embodiment, the inline heater controller 602 may receive information regarding an open circuit, a short circuit, power failure, and/or internal fault. In an embodiment, the wire harness 204 of FIG. 2 comprises of wires 610, 612, 614, 616.

In accordance with an embodiment, the inline heater controllers $202_1$-$202_N$ transfer the operation information regarding the heated assembly 603 received via the one or more sensors to the aircraft controller via the aerospace connector 108. According to an embodiment, the aerospace connector 108 includes one or more pins that communicate with the aircraft controller.

According to an embodiment, the aerospace connector 108 may include respective electrical pins for providing a fault signal and power information. The aerospace connector 108 transmits the information received by the inline heater controllers 100, $202_1$-$202_N$, 302, 402, 502, 602 to the aircraft controller and transmits control information to the heater element positioned within the heated assembly 603. In an embodiment, the control information may include powering off the heater element 608 or powering on the heater element 608. In an example embodiment, the aircraft controller controls the heater element 608 positioned within the heated assembly 603 to ensure that the temperature within the heated assembly 603 remains within a predetermined range.

Figure 5:
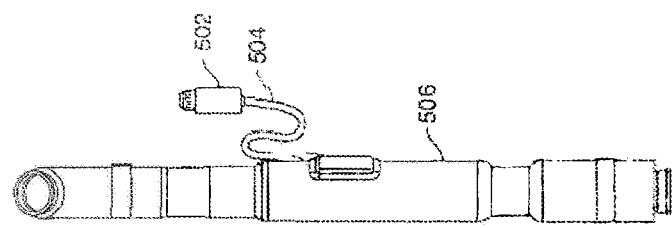
FIG. 5 is a longitudinal view of a tubing having a temperature control and monitoring apparatus, configured according to an embodiment.
Figure 4:
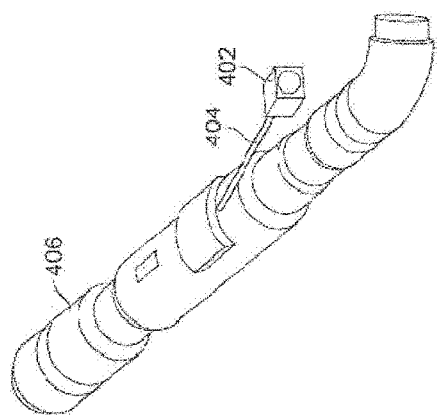
FIG. 4 is an isometric view of a tubing having a temperature control and monitoring apparatus, according to an embodiment.

Turning to FIGS. 3-5, various additional views of the inline heater controller 302, 402, 502 are illustrated. In particular, the inline heater controllers 302, 402, 502 may be connected to the respective tubing 306, 406, and 506 via the respective wire harness 304, 404, 504. As shown in FIGS. 3-5, the inline heater controllers 302, 402, 502 are provided outside of and spaced away from the tubing 306, 406, 506. Of course, a person skilled in the art will appreciate that the inline heater controllers 302, 402, 502 are shown as interacting with aircraft tubing for illustration purposed only, and may be connected to various heated system components on board an aircraft.

One advantage of such a system architecture is that it provides great modularity within the system. In particular, the above system architecture assists in identifying and isolating faulty circuits or heating mechanism within specific sections of the tubing or other heated components more efficiently. Usually, maintenance on board an aircraft may only be performed when the aircraft is grounded, and it is expensive to keep the aircraft grounded while the fault is identified. The inline heater controllers $202_1$-$202_N$ in accordance with the various embodiments discussed above provide an efficient mechanism for identifying and isolating the faulty components. According to an embodiment, the PCB 102 may be replaced without damage to the heater element.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art.

The particular implementations shown and described herein are illustrative examples and are not intended to otherwise limit the scope of the disclosure in any way. The steps of all methods described herein are performable in any suitable order unless otherwise indicated herein or otherwise clearly contradicted by context. The use of any and all examples, or exemplary language (e.g., "such as") provided herein, is intended merely to better illuminate the disclosure and does not pose a limitation on scope. Numerous modifications and adaptations will be readily apparent to those skilled in this art without departing from the spirit and scope of the disclosure.

Certain terms are used throughout the following description to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another.

What is claimed is:

1. An inline heater system on board an aircraft comprising:
   a heater element positioned within a heated component;
   at least one sensor positioned within the heated component configured to monitor temperature within the heated component;
   an inline heater controller configured to receive information regarding the heater element via the at least one sensor, the inline heater controller comprising a housing, a connector, and a printed circuit board;
   wherein the housing accepts the printed circuit board and comprises a first aperture configured to facilitate access to a first end of the printed circuit board, and a second aperture configured to facilitate access to a second end of the printed circuit board, the first end opposite the second end;
   wherein the connector removably couples to the second aperture to facilitate connection between the printed circuit board and the connector;

wherein the inline heater controller is positioned at a location spaced away from the heater element and the heated component; and wherein the inline heater controller is connected to an aircraft control system via the connector and transmits the information regarding the heater element to the aircraft control system.

2. The inline heater system according to claim 1, wherein the inline heater controller is configured to receive the information via a wire harness connected to the at least one sensor.

3. The inline heater system according to claim 1, wherein the at least one sensor is a temperature resistive sensor.

4. The inline heater system according to claim 1, wherein the inline heater controller comprises:

the printed circuit board configured to receive the information regarding the heater element via the at least one sensor; and the connector configured to transmit the information regarding the heater element via the at least one sensor to the aircraft control system.

5. The inline heater system according to claim 4, wherein the printed circuit board may be replaced without interacting with the heater element.

6. The inline heater system according to claim 1, wherein the inline heater controller is configured to provide fault information to the aircraft control system.

7. The inline heater system according to claim 6, wherein the inline heater controller is configured to receive information regarding at least one of an open circuit, a short circuit, an internal fault, or a power failure.

8. The inline heater system according to claim 6, wherein the inline heater controller is configured to determine whether the temperature within the heated component falls within a predetermined range.

9. The inline heater system according to claim 1, wherein the heated component comprises tubing included within one or more of a plumbing system, waste tank system, or a water system on board the aircraft.

10. A method for monitoring system information on board an aircraft, the method comprising:

installing a heater element within a heated component;
installing at least one sensor within the heated component configured to monitor a temperature within the heated component;
collecting sensor information by an inline heater controller regarding the heater element via the at least one sensor, the inline heater controller comprising a housing, a printed circuit board, and a connector; and
transmitting information regarding the heater element to an aircraft control system via the connector;
wherein the inline heater controller is positioned at a location spaced away from the heater element and the heated component;
wherein the housing accepts the printed circuit board and defines a first aperture configured to facilitate access to a first end of the printed circuit board, and a second aperture configured to facilitate access to a second end of the printed circuit board, the first end being opposite the second end;
wherein the connector removably couples to the second aperture to facilitate connection between the printed circuit board and the connector.

11. The method according to claim 10, wherein the inline heater controller is configured to receive the information via a wire harness connected to the at least one sensor.

12. The method according to claim 10, wherein the at least one sensor is a temperature resistive sensor.

13. The method according to claim 10, wherein the inline heater controller comprises:

the printed circuit board configured to receive the information regarding the heater element via the at least one sensor; and the connector configured to transmit the information regarding the heater element via the at least one sensor to the aircraft control system.

14. The method according to claim 13, wherein the inline heater controller is configured to determine whether a temperature inside the heated component falls within a predetermined range, and the method further comprising:

controlling the heater element to be turned on or off when the temperature within the heated component falls outside a predetermined range.

15. The method according to claim 10, wherein the method comprises determining a presence of an electrical fault and transmitting fault information to the aircraft control system via the inline heater controller.

16. The method according to claim 15, wherein the inline heater controller is configured to receive information regarding at least one of an open circuit, a short circuit, an internal fault, or a power failure.

17. The method according to claim 10, wherein the heated component comprises a tubing included within at least one of a plumbing system, waste tank system, or a water system on board the aircraft.

18. An inline heater controller comprising:

a printed circuit board configured to receive information from at least one sensor positioned within a heated component on board an aircraft;
a housing configured to accept the printed circuit board;
wherein the housing accepts the printed circuit board and defines a first aperture configured to facilitate access to a first end of the printed circuit board, and a second aperture configured to facilitate access to a second end of the printed circuit board, the first end being opposite the second end;
a connector configured to transmit the information received from the at least one sensor to an aircraft control system on board the aircraft;
wherein the connector removably couples to the second aperture to facilitate connection between the printed circuit board and the connector;
wherein the inline heater controller is positioned within the aircraft at a location spaced away from the heated component and the at least one sensor; and
wherein the inline heater controller receives information from the at least one sensor via a wire harness.

19. The inline heater controller according to claim 18, being further configured to determine whether a temperature inside the heated component falls within a predetermined range.

20. The inline heater controller according to claim 18, being further configured to receive information regarding at least one of an open circuit, a short circuit, an internal fault, or a power failure.

21. The inline heater controller according to claim 18, wherein the printed circuit board may be replaced without interacting with a tubing.

* * * * *